(12) United States Patent
Hirano et al.

(10) Patent No.: US 6,879,909 B2
(45) Date of Patent: Apr. 12, 2005

(54) MAP DISPLAY CONTROL APPARATUS, MAP INFORMATION UPDATE APPARATUS, MAP INFORMATION UPDATE SYSTEM AND CONTROL METHOD THEREOF

(75) Inventors: Hideaki Hirano, Sagamihara (JP); Hiroshi Minagawa, Chigasaki (JP); Hitoshi Watanabe, Atsugi (JP); Tetsumori Aikawa, Machida (JP)

(73) Assignee: Xanavi Informatics Corporation, Zama (JP)

( * ) Notice: Subject to any disclaimer, the term of this patent is extended or adjusted under 35 U.S.C. 154(b) by 73 days.

(21) Appl. No.: 10/042,287

(22) Filed: Jan. 11, 2002

(65) Prior Publication Data

US 2004/0015325 A1 Jan. 22, 2004

(30) Foreign Application Priority Data

Jan. 11, 2001 (JP) .................................... 2001-004249

(51) Int. Cl.[7] ................ G01C 210/00; G06G 7/78; G08G 1/123
(52) U.S. Cl. .................. 701/208; 701/210; 701/211; 340/905; 340/995.11; 340/995.12; 340/995.13
(58) Field of Search ................ 701/208, 210, 701/211; 340/905, 995.11, 995.12, 995.13, 995.17

(56) References Cited

U.S. PATENT DOCUMENTS

| | | | | |
|---|---|---|---|---|
| 5,933,100 A | * | 8/1999 | Golding | 340/995.13 |
| 6,075,467 A | * | 6/2000 | Ninagawa | 340/995.14 |
| 6,401,027 B1 | * | 6/2002 | Xu et al. | 707/117 |
| 2002/0029226 A1 | * | 3/2002 | Li et al. | 707/104.1 |
| 2002/0049535 A1 | * | 4/2002 | Rigo et al. | 701/211 |
| 2002/0067289 A1 | * | 6/2002 | Smith | 340/905 |
| 2002/0072848 A1 | * | 6/2002 | Hamada et al. | 701/211 |
| 2002/0091486 A1 | * | 7/2002 | Hubschneider et al. | 701/209 |

* cited by examiner

*Primary Examiner*—Thomas G. Black
*Assistant Examiner*—Brian J Broadhead
(74) *Attorney, Agent, or Firm*—Crowell & Moring LP

(57) ABSTRACT

A map information update system has: a map display control apparatus; and a map information update apparatus. The map display control apparatus includes a map display control unit, a communication control unit, a map information transmission unit and a map information reception unit. The map display control unit controls the display device so as to update the map displayed on the display device based upon the updated information related to the map. The map information update apparatus includes a communication control unit, a map information update reception unit, a map display update data base unit, and an updated map information transmission unit that transmits information related to the map updated by the map information update unit to the map display control apparatus via the communication control unit.

19 Claims, 4 Drawing Sheets

MAP DISPLAY CONTROL APPARATUS, MAP INFORMATION UPDATE APPARATUS, MAP INFORMATION UPDATE SYSTEM AND CONTROL METHOD THEREOF

INCORPORATION BY REFERENCE

The disclosure of the following priority application is herein incorporated by reference:
Japanese Patent Application No. 2001-4249 filed Jan. 11, 2001

BACKGROUND OF THE INVENTION

1. Field of the Invention

The present invention relates to a map display control apparatus that controls map display, a map information update apparatus, a map information update system and control methods thereof.

2. Description of the Related Art

There are car navigation systems in the known art that achieve a function of displaying a roadmap of an area around the current vehicle position, a function of calculating a recommended route from the start point to a destination, a function of providing route guidance based upon the calculated recommended route and the like.

However, there is a problem with such a car navigation system in that the necessity to assure safe driving limits its operation while driving the vehicle and thus, a desired map cannot always be displayed in the moving vehicle. There is an information providing system in the known art that connects a user (customer) car navigation system to a center-side system through a data mode of a digital portable telephone (PDC: Personal Digital Cellular) and provides various types of information available at the center-side system to the user.

SUMMARY OF THE INVENTION

An object of the present invention is to provide a map display control apparatus, a map information update apparatus and a map information update system capable of achieving a desired map display by utilizing an information providing system or the like and also relates to control methods thereof.

A map display control apparatus comprises: a map display control unit that controls a display device so as to display a map on the display device based upon map display data; a communication control unit that connects with another control apparatus via a digital mobile telephone system to engage in exchange of digital data; a map information transmission unit that transmits information related to the map currently displayed on the display device to the other control apparatus via the communication control unit; and a map information reception unit that receives information related to the map updated by the other control apparatus from the other control apparatus via the communication control unit, wherein: the map display control unit controls the display device so as to update the map displayed on the display device based upon the updated information related to the map received at the map information reception unit.

A map information update apparatus comprises: a communication control unit that connects via a digital mobile telephone system with a map display control apparatus, which controls a display device so as to display a map on the display device based upon map display data, to engage in exchange of digital data; a map information update reception unit that receives information related to the map currently displayed on the display device from the map display control apparatus via the communication control unit; a map display update data base unit that stores map display data for update related to the map display data utilized by the map display control apparatus; a map information update unit that updates the information related to the map by using the map display data related to the map display data utilized by the map display control apparatus; and an updated map information transmission unit that transmits the information related to the map updated by the map information update unit to the map display control apparatus via the communication control unit.

A map information update system comprises: a map display control apparatus; and a map information update apparatus. And the map display control apparatus comprises: a map display control unit that controls a display device so as to display a map on the display device based upon map display data; a communication control unit that connects with the map information update apparatus via a digital mobile telephone system to engage in exchange of digital data; a map information transmission unit that transmits information related to the map currently displayed on the display device to the map information update apparatus via the communication control unit; and a map information reception unit that receives information related to the map updated by the map information update apparatus from the map information update apparatus via the communication control unit, and the map display control unit controls the display device so as to update the map displayed on the display device based upon the updated information related to the map received at the map information reception unit. The map information update apparatus comprises: a communication control unit that connects with the map display control apparatus via the digital mobile telephone system to engage in exchange of digital data; a map information update reception unit that receives information related to the map currently displayed on the display device from the map display control apparatus via the communication control unit; a map display update data base unit that stores map display data for update related to the map display data utilized by the map display control apparatus; a map information update unit that updates the information related to the map by using the map display data related to the map display data utilized by the map display control apparatus; and an updated map information transmission unit that transmits the information related to the map updated by the map information update unit to the map display control apparatus via the communication control unit.

A navigation system comprises: a current position detection unit that detects a current position thereof; a map display control unit that controls a display device so as to display a map on the display device for road guidance based upon the current position detected by the current position detection unit and map display data; a communication control unit that connects with another control apparatus via a digital mobile telephone system to engage in exchange of digital data; a map information transmission unit that transmits information related to the map currently displayed on the display device to the other control apparatus via the communication control unit; and a map information reception unit that receives information related to the map updated by the other control apparatus from the other control device via the communication control unit, and the map display control unit controls the display device so as to update the map displayed on the display device based upon the updated information related to the map received at the map information reception unit.

A car navigation system comprises: a current position detection unit that detects a current position of a vehicle; a map display control unit that controls a display device so as to display a map on the display device for road guidance based upon the vehicle current position detected by the current position detection unit, map display data and map display control information; a communication control unit that connects with an off-vehicle control apparatus via a digital mobile telephone system to engage in exchange of digital data; and a map information reception unit that receives the map display control information from the off-vehicle control apparatus via the communication control unit.

A map display control method comprises: a map display control step in which a display device is controlled so as to display a map on the display device based upon map display data; a communication control step in which digital data are exchanged with another control apparatus via a digital mobile telephone system; a map information transmission step in which information related to the map currently displayed on the display device is transmitted to the other control apparatus; and a map information reception step in which information related to the map updated by the other control apparatus is received from the other control apparatus, and in the map display control step the display device is controlled so as to update the map displayed on the display device based upon the updated information related to the map received through the map information reception step.

A map information update control method comprises: a communication control step in which digital data are exchanged via a digital mobile telephone system with a map display control apparatus that controls a display device so as to display a map on the display device based upon map display data; a map information update reception step in which information related the map currently displayed on the display device is received from the map display control apparatus; a map information update step in which information related to the map is updated by using map display data which are stored in a map information update device related to map display data utilized by the map display control apparatus; and an updated map information transmission step in which the information related to the map updated through the map information update step is transmitted to the map display control apparatus.

A computer-readable computer program product contains a map display control program used in a map display control apparatus, and the map display control program comprises: map display control instructions for controlling a display device so as to display a map on the display device based upon map display data; communication control instructions for exchanging digital data with another control apparatus via a digital mobile telephone system; map information transmission instructions for transmitting information related to the map currently displayed on the display device to the other control apparatus; and map information reception instructions for receiving information related to the map updated by the other control apparatus from the other control apparatus, wherein: in response to the map display control instructions, the display device is controlled so as to update the map displayed on the display device based upon the updated information related to the map received in response to the map information reception instructions.

A computer-readable computer program product contains a map information update control program used in a map information update apparatus, and the map information update control program comprises: communication control instructions for exchanging digital data with a map display control apparatus, which controls a display device so as to display a map on the display device based upon map display data, via a digital mobile telephone system; map information update reception instructions for receiving information related to the map currently displayed on the display device from the map display control apparatus; map information update instructions for updating information related to the map by using map display data which are stored within the map information update device related to map display data utilized by the map display control apparatus; and update map information transmission instructions for transmitting the information related to the map updated in response to the map information update instructions to the map display control apparatus.

It is preferred that the above computer-readable computer program product is a recording medium on which the control program is recorded.

Or, it is preferred that the above computer-readable computer program product is a carrier wave in which the control program is embodied as a data signal.

DESCRIPTION OF THE PREFERRED EMBODIMENT

Figure 1:
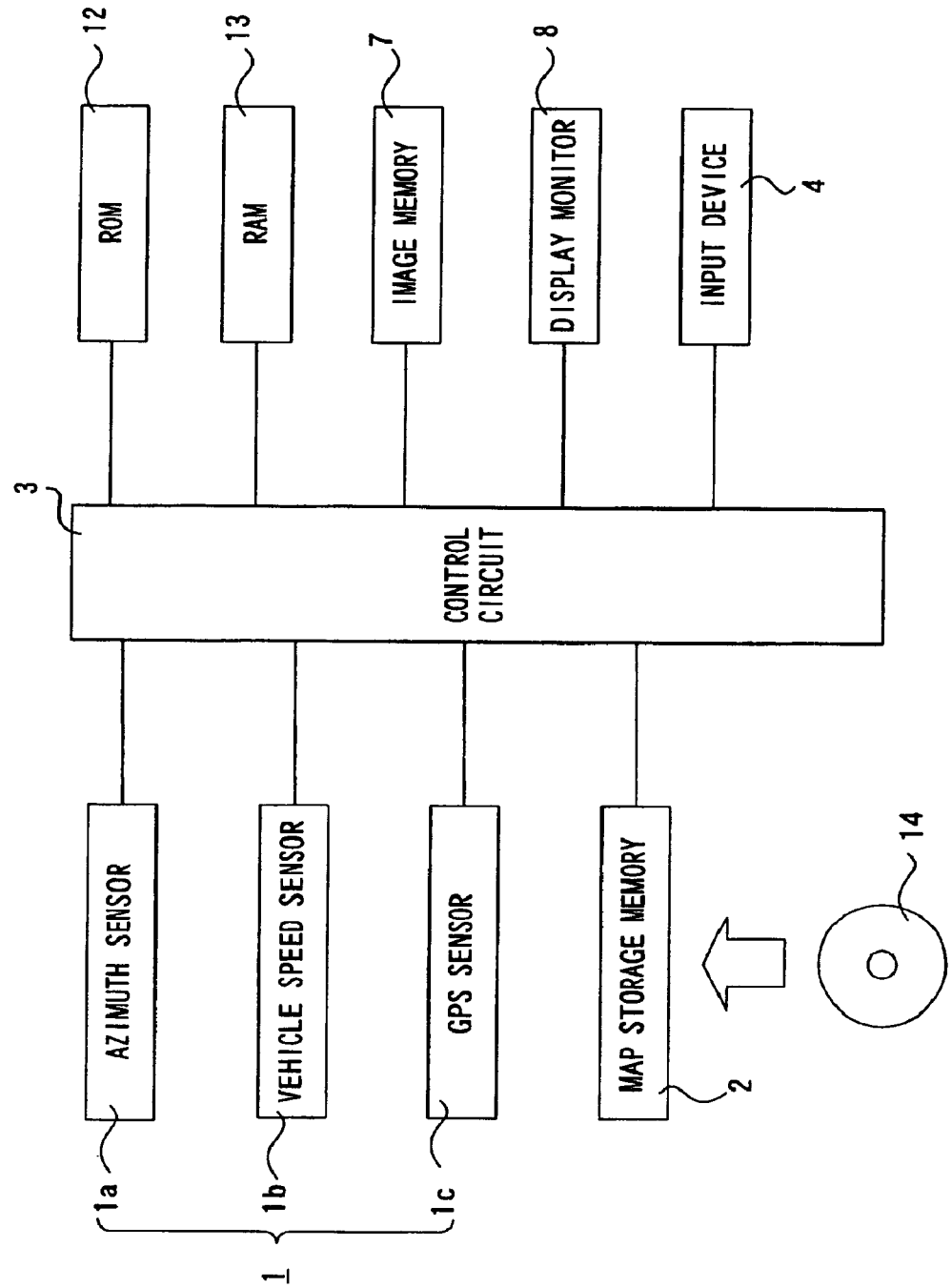
FIG. 1 presents a block diagram of the car navigation system achieved in an embodiment of the present invention.

FIG. 1 is a block diagram of the car navigation system achieved in an embodiment of the present invention. The car navigation system achieves a function of providing information related to the traveling state of the vehicle. To be more specific, it achieves a function of displaying a roadmap around the current vehicle position, a function of calculating a recommended route from a start point to a destination, a function of providing route guidance based upon the calculated recommended route and the like. The apparatus engages in so-called navigation or route guidance.

Reference numeral 1 in FIG. 1 indicates a current position detection device that detects the current position of the vehicle and may be constituted of, for instance, an azimuth sensor 1a that detects the advancing azimuth of the vehicle, a vehicle speed sensor 1b that detects the vehicle speed, a GPS sensor 1c that detects a GPS signal from a GPS (Global Positioning System) satellite and the like. Reference numeral 2 indicates a map storage memory for storing roadmap data, constituted of a recording medium, i.e., a CD-ROM 14, having stored therein roadmap data and a read device that reads out the roadmap data. The recording medium does not need to be a CD-ROM and any of various types of recording medium including magnetic tape and DVD may be utilized, instead.

Reference numeral 3 indicates a control circuit that controls the overall apparatus and is constituted of a microprocessor and its peripheral circuits. The control circuit 3 implements the various types of control to be detailed later by executing a control program stored in a ROM 12 by utilizing a RAM 13 as a work area. Reference numeral 4 indicates an input device having various switches through which a destination and the like are input for the vehicle. It includes a joystick through which instructions for cursor movement and screen scrolling are issued. It is to be noted that the input device 4 may be a remote control device. In addition, touch panel switches may be provided within the screen.

Reference numeral 7 indicates an image memory for storing image data to be displayed at a display monitor 8, and the image data are constituted of roadmap drawing data and various graphic data. The image data stored in image memory 7 are read out as necessary and displayed at the display monitor 8. The control circuit 3 functions as an output device that outputs a display signal to the display monitor 8.

The car navigation system assuming the structure described above implements various types of navigation based upon the current vehicle position information obtained at the current position detection device 1 and the roadmap data stored in the map storage memory 2. For instance, it displays a roadmap of an area around the current vehicle position and the current vehicle position at the display monitor 8 and provides the driver with guidance along the route obtained through a route search.

Figure 2:
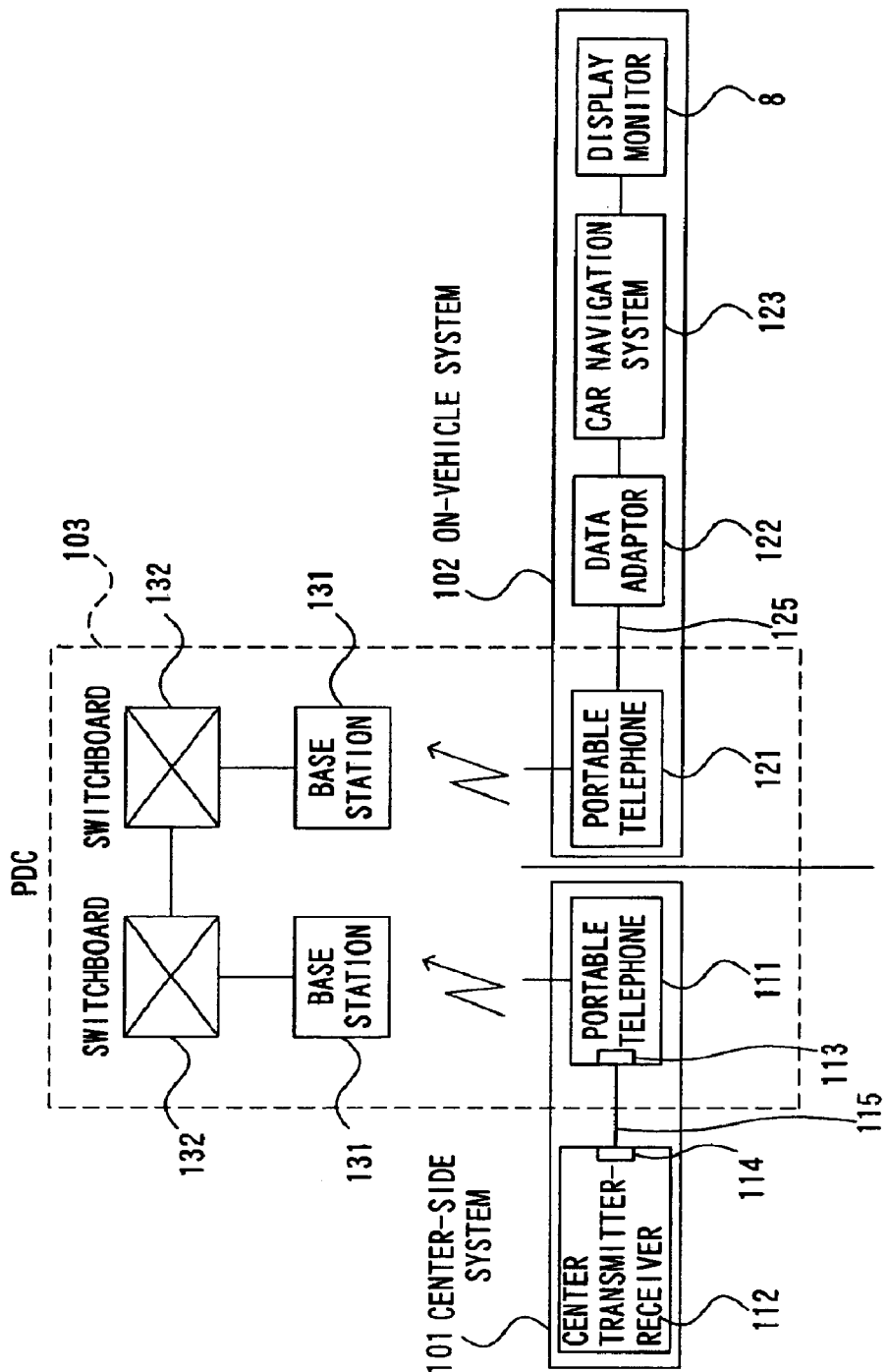
FIG. 2 shows the overall structure of an information providing system which include a car navigation system.

FIG. 2 shows the overall configuration of an information providing system which includes the car navigation system described above. Reference numeral 101 indicates a center-side system, which constitutes a base for providing users (customers) with various types of information. Reference numeral 102 indicates an on-vehicle system which is a user-side system and receives the various types of information from the center-side system 101. Reference numeral 103 indicates an existing digital portable telephone system (PDC) utilized in the information providing system.

The information providing system provides the user with information when the user needing the various types of information through a data communication supported by the digital portable telephone system 103 available at the center side system 101 calls the center-side system 101. In addition, the user vehicle position information and the like transmitted from the on-vehicle system 102 to the center-side system 101 may be used as search information at the center-side system 101. Information may sometimes be provided by the center-side system 101 through a telephone call to the user. The information providing system provides various services through bidirectional communication as described above and the services offered by the information providing system are referred to as information providing services.

The digital portable telephone system 103 is a digital portable telephone system that enables wireless telephone communication via radio waves. Uniform standards including various protocols are adopted in digital portable telephone systems 103 in Japan in conformance to the "Digital System Car Telephone System Standard" RCR STD-27F (or its most recent revision). A plurality of digital portable telephone systems are provided by a plurality of business operators in conformance to these standards, and one of such digital portable telephone systems is used in the embodiment.

The center-side system 101 is constituted of a portable telephone mobile terminal 111 (which is a mobile telephone terminal and is hereafter simply referred to as a portable telephone) and a center transmitter-receiver 112. The portable telephone 111 enables voice telephone communication (voice mode) and also has a function which allows digital data exchange with a computer or the like (data mode). The portable telephone 111 is a digital portable telephone available on the commercial market. The center transmitter-receiver 112 which is constituted of a computer system such as a personal-computer, a workstation or a general purpose computer, and although not shown, it is capable of connecting with another computer system through the Internet, any of various types of personal computer communication, a LAN (local area network) or a WAN (wide area network).

A connector 113 for digital data transfer is provided at the bottom of the portable telephone 111. The center transmitter-receiver 112, on the other hand, includes an expansion board 114 which supports a digital portable telephone system, and the connector 113 and the expansion board 114 are connected with each other through a specific cable 115. As the cable 115 (the connector of the cable 115 to be more exact) becomes connected to the connector 113, the portable telephone 111 automatically enters the data mode. In the center transmitter-receiver 112 constituted of a computer system, a control program related to this information providing system is executed.

It is to be noted that a telephone other than a mobile telephone may be connected to the center-side system 101 It may be a fixed digital telephone connected to the general public line networks of NTT (Nippon Telephone and Telegraph).

The on-vehicle system 102 comprises a portable telephone 121, a data adapter 122, a car navigation system 123 and the display monitor 8 constituting part of the car navigation system 123. The portable telephone 121 is similar to the portable telephone 111 mentioned earlier. The car navigation system 123 is the car navigation system explained earlier. The control circuit 3 of the car navigation system executes a program related to car navigation and also executes a control program for implementing control on signal exchange with the data adapter 122. It is to be noted that the car navigation system 123 is provided with a communication I/F (not shown) which is connected to the data adapter 122.

The data adapter 122 achieves various functions as an interface for data exchange between the portable telephone 121 and the car navigation system 123. Its internal structure includes a microprocessor and its peripheral circuits (not shown) to enable execution of various functions in conformance to the control program. The portable telephone 121 which is connected to a cable 125, is set in the data mode as is the portable telephone 111.

The digital portable telephone system 103, which is an existing digital portable telephone system provided by a digital portable telephone business operator as described earlier, is constituted of base stations that engage in wireless signal communication with the portable telephones 111 and 121, switchboards 132 connected to the base stations 131 and also connected with each other to form a digital portable telephone network and the like. It is to be noted that since the digital portable telephone system itself is of the known art, its detailed explanation is omitted.

Figure 3:
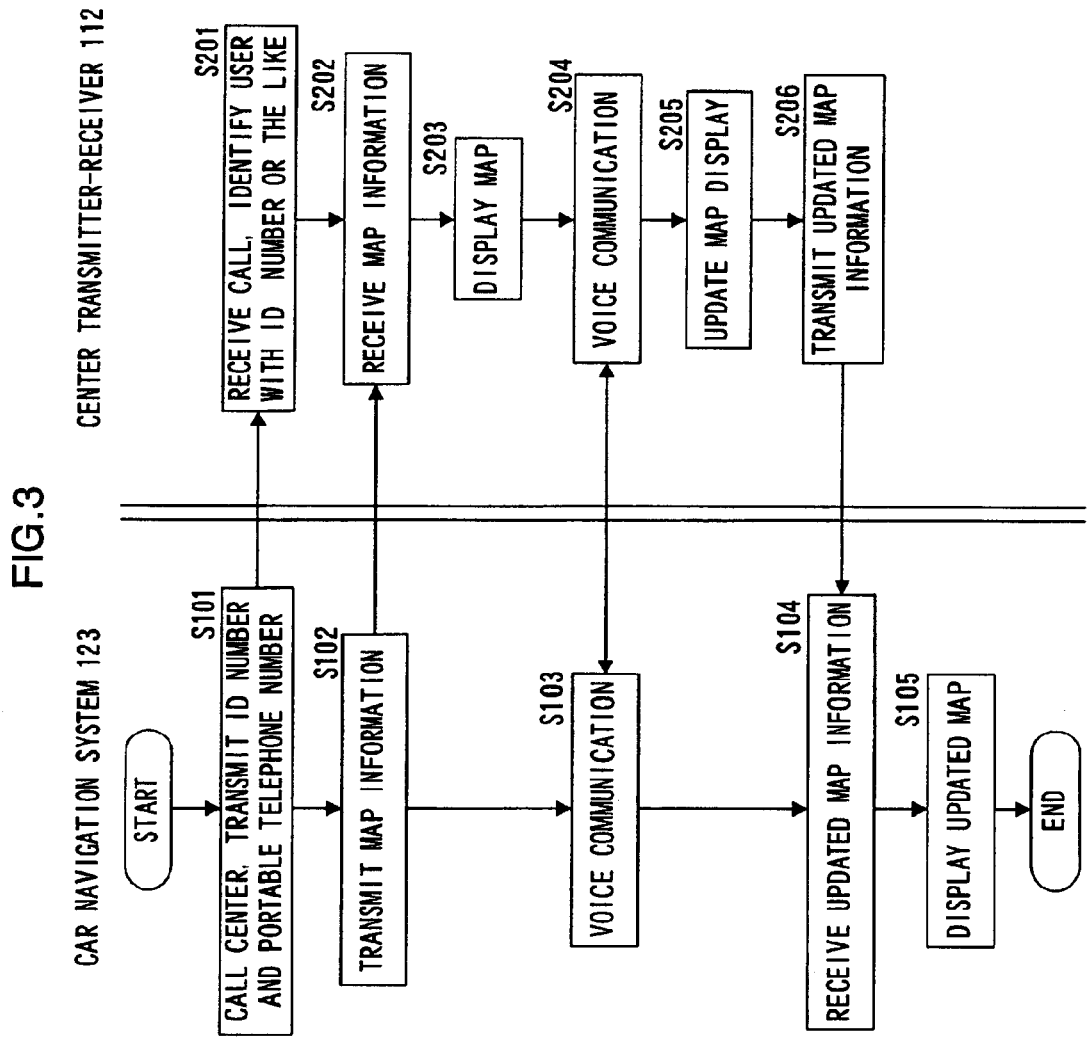
FIG. 3 presents a flowchart of the control implemented at the center transmitter-receiver and the car navigation system.

According to the present invention, the information providing system described above is utilized to update the map display at the car navigation system 123. FIG. 3 presents a flowchart of the control implemented by the center transmitter-receiver 112 in the center-side system 101 and by the car navigation system 123 in the on-vehicle system 102. An explanation is now given in reference to FIG. 3 on the processing executed at the car navigation system 123 which is shown on the left side and on the processing executed by the center transmitter-receiver 112 which is shown on the right side.

This processing routine is started up as the user (the vehicle driver or the like) of the car navigation system 123 selects a map display update mode the operation in which is performed by utilizing the information providing system. The map display update mode, the operation in which is performed by utilizing the information providing system, is selected and activated through a specific menu screen selection, by touching a map display update mode selector button displayed in the map display or through voice-recognition. It is assumed that a specific map is on display at the display monitor 8 of the car navigation system 123 when this processing routine is started up.

In step S101, the car navigation system 123 calls the center-side system 101 via the data adapter 122 and the portable telephone 121 and establishes contact. Since an ID number of the data adapter 122 and the portable telephone number of the portable telephone 111 are transmitted when the call is made to the center-side system 101, the center transmitter-receiver 112 is enabled to identify the user, i.e., which of the users subscribing to the information providing system services has made the call by recognizing the ID number and the portable telephone number.

In step S201, the center transmitter-receiver 112 receives the call from the car navigation system 123 and identifies the user based upon the portable telephone number or the transmitted ID number. Then, the operation proceeds to step S202.

After contact is established, the car navigation system 123 transmits information related to the map currently on display at the display monitor 8 to the center transmitter-receiver 112 in step S102. The map information transmitted in this step includes the classification of the roadmap data currently in use, the map display mode, the current vehicle position data and the map scaling data. The roadmap data classification refers to information which makes it possible to identify the roadmap data currently utilized at the car navigation system 123. It enables identification of the roadmap data publisher who published the particular roadmap data, the type of roadmap data and the specific revised edition in which the data were published and the like. The map display mode information refers to information indicating whether the current vehicle position and a map of the vicinity are currently on display or a map is to be displayed to facilitate guidance along the route searched through a route search, whether or not convenience stores and the like are included in the display, whether or not traffic jam information is to he included in the display and the like.

In the center transmitter-receiver 112, the map information is received from the car navigation system 123 in step S202, before the operation proceeds to step S203 In step S203, a map is displayed at a monitor (not shown) of the center transmitter-receiver 112 based upon the map information transmitted from the car navigation system 123 and roadmap data held at the center transmitter-receiver 112. The center transmitter-receiver 112, which has various types of roadmap data stored in a storage device (not shown), identifies the roadmap data currently utilized at the car navigation system 123 in conformance to the roadmap data classification information that has been transmitted, extracts the recognized roadmap data from the various types of roadmap data and uses the extracted roadmap data. As a result, the roadmap currently displayed at the display monitor 8 of the car navigation system 123 is reproduced at the monitor of the center transmitter-receiver 112.

In other words, the map information transmitted from the car navigation system 123 should be regarded as information necessary to reproduce the map currently on display at the display monitor 8 of the car navigation system 123 on the monitor of the center transmitter-receiver 112. Since the center transmitter-receiver 112 already has the roadmap data, the roadmap data themselves are not transmitted during this process. Namely, the map information is map display control information enabling control on specifically how the map should be displayed by using roadmap data. It is to be noted that if the volume of the roadmap data is not large, the roadmap data for display may be transmitted instead.

In step S103 and step S204, the car navigation system 123 and the center transmitter-receiver 112 respectively are engaged in voice communication. Once the communication is established on the telephone line in steps S101 and S201, the car navigation system 123 and the center transmitter-receiver 112 can also be used for voice communication through microphones and speakers (not shown). Namely, the user (the driver or the like) of the on-vehicle system 102 and an operator at the center-side system 101 are allowed to conduct a voice conversation i.e., a normal telephone conversation.

For instance, the user of the car navigation system 123 may tell the operator at the center-side system 101 that he wishes to change the scale of the map display. In response, the operator at the center-side system 101 performs an operation for changing the map display scale through a keyboard, a mouse or the like based upon the contents of the user request. At this time, the operator at the center-side system 101 is able to perform the operation by looking at the map which is identical to the map currently on display at the car navigation system 123, and thus, share a common perception of the map display with the user of the car navigation system 123.

In response to the operation performed by the operator at the center-side system 101, the center transmitter-receiver 112 updates the map display based upon the instructions given through the operation in step S205. In the map display update, the map information mentioned earlier is updated and the map display is updated based upon the updated contents of the map information. In step S206, the updated map information is transmitted to the car navigation system 123.

The updated map information is received at the car navigation system 123 in step S104 before the operation proceeds to step S105. In step S105, the map information stored in the car navigation system 123 is updated based upon the updated map information that has been received. In addition, the map display at the display monitor 8 is updated based upon the updated map information within the car navigation system 123, and then the processing ends. It is to be noted that the operation may return to step s103 instead of immediately ending the processing after step S105, so as to repeatedly execute the processing until the desired map display is achieved.

As described above, the contents currently on display at the car navigation system 123 can be modified and updated by utilizing the information providing system without necessitating any user (driver or the like) operation. Thus, desired map display is achieved at the car navigation system while assuring safety of the vehicle in transit. In addition, since a detailed voice conversation can be carried out between the user (driver or the like) of the on-vehicle system 102 and the operator at the center-side system 101, the map display requested by the user (driver or the like) can be achieved more speedily with a high degree of reliability. Furthermore, since the operator at the center-side system 101 is highly skilled and experienced in the system operation, the map display requested by the user (driver or the like) can be brought up promptly.

It is to be noted that while an explanation is given above in reference to the embodiment on an example in which the digital portable telephone system provided by a specific portable telephone business operator is used, the present invention is not limited to this example. The present invention may also be adopted in conjunction with data exchange between two different digital portable telephone systems provided by different portable telephone business operators. In addition, it may be adopted in conjunction with a PHS (digital cordless telephone system). It may also be adopted in conjunction with data exchange between a digital portable telephone system and a PHS. In other words, the present intention may be adopted in all situations in which a digital mobile telephone system is utilized. Furthermore, a telephone connected with the center-side system does not need to be a mobile telephone and it may be a fixed digital telephone connected to the general public telephone line networks of NTT (Nippon Telephone and Telegraph). However, it is necessary to coordinate the communication protocols in the various cases described above.

While an explanation is given in reference to the embodiment on an example in which the map scale is changed, the present invention is not limited to this example. It may instead be adopted when, for instance, switching the normal roadmap display mode to the convenience store display mode or vice versa or when switching to the traffic jam information display mode. Namely, the present invention may be adopted when changing or updating the mode to any of the map display modes supported by the car navigation system. In this case, the map information described above includes data corresponding to the individual mode changes.

While an explanation is given above in reference to the embodiment on an example in which the center transmitter-receiver 112 has stored therein roadmap data identical to various types of roadmap data used in various types of car navigation systems, the present invention is not limited to this example. The roadmap data stored in the center transmitter-receiver 112 may adopt any structure as long as the center transmitter-receiver 112 is enabled to reproduce map display at various types of car navigation systems. Namely, the center transmitter-receiver 112 should have of stored therein map display data related to roadmap data used in various types of car navigation systems.

Furthermore, while an explanation is given above in reference to the embodiment on an example in which the present invention is adopted in conjunction with a car navigation system, the present invention is not limited to this example. It may be adopted in conjunction with a portable navigation system instead. It does not need to be adopted in conjunction with navigation systems alone either. In other words, it may be adopted in conjunction with all types of apparatuses that display maps. For instance, the present invention may be adopted in conjunction with portable telephones.

While an explanation is given above in reference to the embodiment on an example in which map display is updated, the present invention is not limited to this example. It may be instead adopted to update display other than map display.

While an explanation is given in reference to the embodiment on an example in which the control program executed by the control circuit 3 of the car navigation system is stored in the ROM 12, the present invention is not limited to this example. The control program and the installation program may be provided in a recording medium such as a CD-ROM 14, instead.

Figure 4:
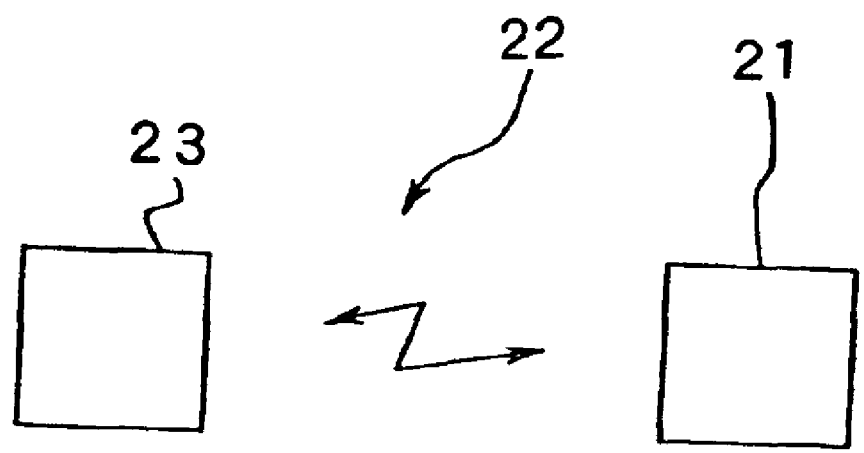
FIG. 4 illustrates how the program may be provided via a transmission medium.

These programs maybe provided via a transmission medium such as a communication line a typical example of which is the Internet, instead. Namely, the programs may be converted to signals on a carrier wave that transmits through the transmission medium and be transmitted. FIG. 4 illustrates how this may be achieved. A car navigation system 21, which is the car navigation system explained above, is capable of connecting with a communication line 22. A computer 23 is a server computer that provides the control program for the car navigation system 21 stored therein. The communication line 22 may be a communication line for communication on the Internet or for personal computer communication, or it may be a dedicated communication line. The communication line 22 may be telephone line, a wireless telephone line, a portable telephone line or the like. The program may be provided through the information providing system explained above as well.

As described above, the program may be distributed as a computer-readable computer program product assuming any of various modes including a recording medium and a carrier wave.

It is to be noted that the car navigation system may be realized by executing the control program on a personal computer. In such a case, the current position detection device 1 and the like should be connected to a specific I/O port or the like of the personal computer.

The above described embodiments are examples, and various modifications can be made without departing from the spirit and scope of the invention.

What is claimed is:

1. A map display control apparatus comprising:
   a map display control unit that controls a display device so as to display a map on the display device based upon map display data;
   a communication control unit that connects with a second control apparatus via a digital mobile telephone system to engage in exchange of digital data;
   a map information transmission unit that transmits information related to the map currently displayed on the display device to the second control apparatus via the communication control unit, the information related to the map being sufficient information to allow the second control apparatus to reproduce the map currently displayed on the display device; and
   a map information reception unit that receives from the second control apparatus via the communication control unit information related to an updated map based upon the reproduced map by the second control apparatus from the sufficient information, wherein:
   the map display control unit controls the display device so as to update the map displayed on the display device based upon the information related to the updated map received at the map information reception unit.

2. A map display control apparatus according to claim 1, further comprising:
   a voice communication control unit that allows an operator of the second control apparatus and a user of the map display control apparatus to conduct a voice conversation.

3. A map information update apparatus comprising:
   a communication control unit that connects via a digital mobile telephone system with a map display control apparatus, which controls a display device so as to display a map on the display device based upon map display data, to engage in exchange of digital data;

a map information update reception unit that receives information related to the map currently displayed on the display device from the map display control apparatus via the communication control unit, the information related to the map being sufficient information to reproduce at the map information update apparatus the map currently displayed on the display device of the map display control apparatus;

a map display update data base unit that stores map display data for update related to the map display data utilized by the map display control apparatus;

a map information update unit that reproduces the map currently displayed on the display device of the map display control apparatus by using the received information related to the map and updates the man based upon the reproduced man and the map display data for update related to the map display data utilized by the map display control apparatus; and an updated map information transmission unit that transmits the information related to the map updated by the map information update unit to the map display control apparatus via the communication control unit.

4. A map information update apparatus according to claim 3, further comprising:

a voice communication control unit that allows an operator of the map information update apparatus and a user of the map display control apparatus to conduct a voice conversation.

5. A map information update system comprising:

a map display control apparatus; and a map information update apparatus, wherein the map display control apparatus comprises:

a map display control unit that controls a display device so as to display a map on the display device based upon first map display data;

a first communication control unit that connects with the map information update apparatus via a digital mobile telephone system to engage in exchange of digital data;

a map information transmission unit that transmits information related to the map currently displayed on the display device to the map information update apparatus via the first communication control unit;

a second communication control unit that allows an operator of the map information update apparatus and a user of the map display control apparatus to conduct a voice conversation;

a map information reception unit that receives information related to a map updated by the map information update apparatus from the map information update apparatus via the first communication control unit; and the map display control unit being enabled to control the display device so as to update the map displayed on the display device based upon the updated information related to the map received at the map information reception unit, and the map information update apparatus comprises:

a third communication control unit that connects with the map display control apparatus via the digital mobile telephone system to engage in exchange of digital data;

a map information update reception unit that receives information related to the map currently displayed on the display device from the map display control apparatus via the third communication control unit;

a map display update data base unit that stores map display data for update related to the map display data utilized by the map display control apparatus;

a fourth communication control unit that allows an operator of the map information update apparatus and a user of the map display control apparatus to conduct a voice conversation with the second communication control unit at the map display control apparatus;

a map information update unit that updates the information related to the map based upon the voice conversation between the operator of the map information update apparatus and the user of the map display control apparatus by using the map display data for update related to the map display data utilized by the map display control apparatus; and an updated map information transmission unit that transmits the information related to the map updated by the map information update unit to the map display control apparatus via the third communication control unit.

6. A map information update system according to claim 5, wherein the information related to the map transmitted from the map display control apparatus to the map information update apparatus is information necessary to reproduce at the map information update apparatus the map currently displayed on the display device of the map display control apparatus.

7. A map information update system according to claim 5, wherein the information related to the map is map display control information enabling control on how a map should be displayed by using the map display data.

8. A map information update system according to claim 5, wherein the information related to the map includes information related to a map scale.

9. A map information update according to claim 5, wherein the information related to the map includes information indicating whether or not traffic jab information is to be displayed.

10. A navigation system comprising:

a current position detection unit that detects a current position thereof;

a map display control unit that controls a display device so as to display a map on the display device for road guidance based upon the current position detected by the current position detection unit and map display data;

a communication control unit that connects with a second control apparatus via a digital mobile telephone system to engage in exchange of digital data;

a map information transmission unit that transmits information related to the map currently displayed on the display device to the second control apparatus via the communication control unit, the information related to the map being sufficient information to allow the second control apparatus to reproduce the map currently displayed on the display device; and a map information reception unit that receives from the second control apparatus via the communication control unit information related to an updated map based upon the reproduced map by the second control apparatus from the sufficient information, wherein:

the map display control unit controls the display device so as to update the map displayed on the display device based upon the information related to the updated map received at the map information reception unit.

11. A map information update control method comprising:

displaying a map based upon map display data at a navigation apparatus;

transmitting information related to the map currently displayed at the navigation apparatus, from the navigation apparatus to a center system;

reproducing, at the center system, the map currently displayed at the navigation apparatus based upon the information related to the map transmitted from the navigation apparatus;

updating, by an operator at the center system, the map reproduced at the center system based upon a telephone conversation between a user of the navigation apparatus and the operator at the center system, wherein the user of the navigation apparatus informs the operator of a desire to change the map currently displayed at the navigation apparatus;

transmitting the information related to the map updated at the center system, from the center system to the navigation apparatus; and updating the map currently displayed at the navigation apparatus based upon the information related to the updated map transmitted from the center system.

12. A map display control method comprising:

a map display control step in which a display device is controlled so as to display a map on the display device based upon map display data;

a communication control step in which digital data are exchanged with a second control apparatus via a digital mobile telephone system;

a map information transmission step in which information related to the map currently displayed on the display device is transmitted to the other control apparatus, the information related to the map being sufficient information to allow the second control apparatus to reproduce the map currently displayed on the display device; and a map information reception step in which information related to the map updated based upon the reproduced map by the second control apparatus is received from the second control apparatus, wherein:

in the map display control step the display device is controlled so as to update the map displayed on the display device based upon the information related to the updated map received through the map information reception step.

13. A map information update control method for a map information update apparatus comprising:

a communication control step in which digital data are exchanged via a digital mobile telephone system with a map display control apparatus that controls a display device so as to display a map on the display device based upon map display data;

a map information update reception step in which information related to the map currently displayed on the display device is received from the map display control apparatus, the information related to the map being sufficient information to reproduce at the map information update apparatus the map currently displayed on the display device of the map display control apparatus; and a map information update step in which the map currently displayed on the display device of the map display control apparatus is reproduced by using the received information related to the map and is updated based upon the reproduced map and map display data for update which are stored in the map information update apparatus and related to the map display data utilized by the map display control apparatus; and an updated map information transmission step in which the information related to the map updated through the map information update step is transmitted to the map display control apparatus.

14. A computer-readable computer program product containing a map display control program used in a map display control apparatus, the map display control program comprising:

map display control instructions for controlling a display device so as to display a map on the display device based upon map display data;

communication control instructions for exchanging digital data with a second control apparatus via a digital mobile telephone system;

map information transmission instructions for transmitting information related to the map currently displayed on the display device to the other control apparatus, the information related to the map being sufficient information to allow the second control apparatus to reproduce the map currently displayed on the display device; and map information reception instructions for receiving information related to the map updated based upon the reproduced map by the second control apparatus from the second control apparatus, wherein:

in response to the map display control instructions, the display device is controlled so as to update the map displayed on the display device based upon the information related to the updated map received in response to the map information reception instructions.

15. A computer-readable computer program product according to claim 14, wherein the computer-readable computer program product is a recording medium on which the control program is recorded.

16. A computer-readable computer program product according to claim 14, wherein the computer-readable computer program product is in a carrier wave in which the control program is modulated as a data signal.

17. A computer-readable computer program product containing a map information update control program used in a map information update apparatus, the map information update control program comprising:

communication control instructions for exchanging digital data with a map display control apparatus, which controls a display device so as to display a map on the display device based upon map display data, via a digital mobile telephone system;

map information update reception instructions for receiving information related to the map currently displayed on the display device from the map display control apparatus, the information related to the map being sufficient information to reproduce at the map information update apparatus the map currently displayed on the display device of the map display control apparatus;

map information update instructions for reproducing the map currently displayed on the display device of the map display control apparatus by using the received information related to the map and updating the map based upon the reproduced map and map display data for update which are stored within the map information update device and related to the map display data utilized by the map display control apparatus; and update map information transmission instructions for transmitting the information related to the map updated in response to the map information update instructions to the map display control apparatus.

18. A computer-readable computer program product according to claim 17, wherein the computer-readable computer program product is a recording medium on which the control program is recorded.

19. A computer-readable computer program product according to claim 17, wherein the computer-readable computer program product is in a carrier wave in which the control program is modulated as a data signal.

* * * * *